UNITED STATES PATENT OFFICE.

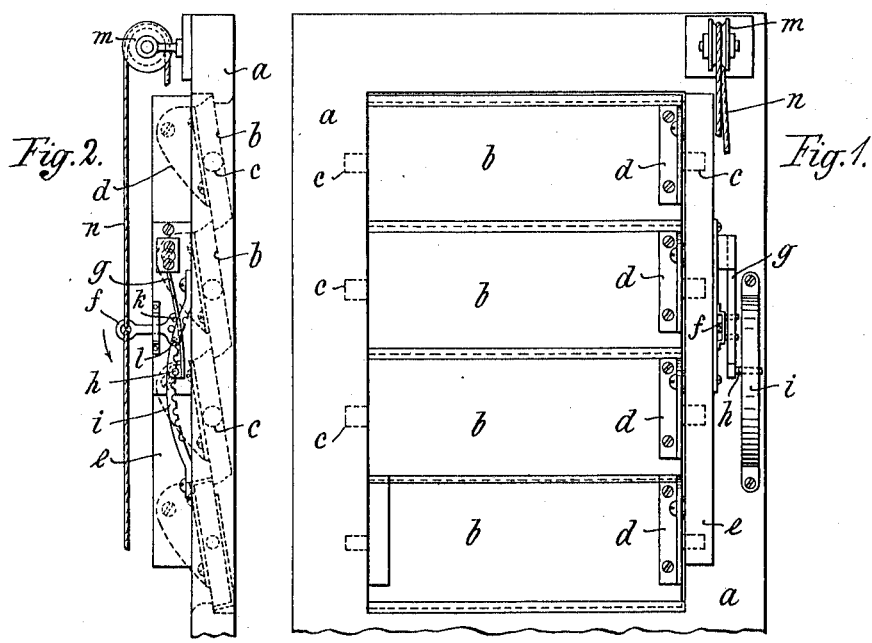
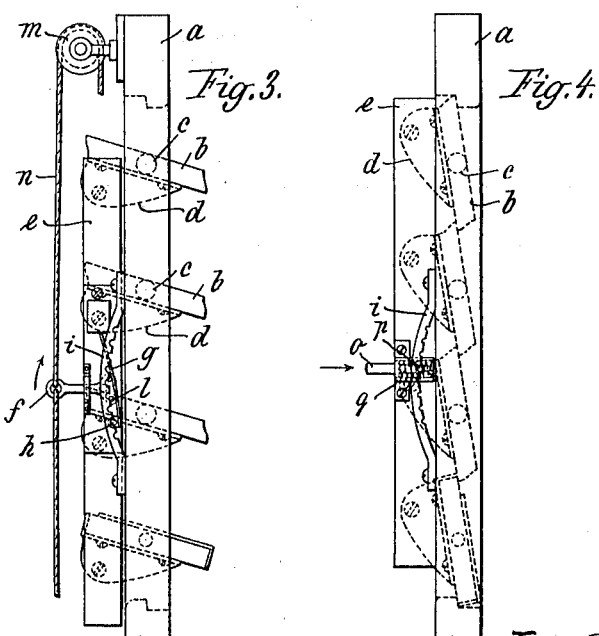

BARTHOLOMÄUS JÄCKLE, OF LOCHERHOF, GERMANY.

FASTENER FOR BLIND-SLATS.

1,039,291.  Specification of Letters Patent.  Patented Sept. 24, 1912.

Application filed August 8, 1910. Serial No. 576,200.

*To all whom it may concern:*

Be it known that I, BARTHOLOMÄUS JÄCKLE, a subject of the Grand Duke of Baden, residing at Locherhof, Grand Duchy of Baden, Germany, have invented certain new and useful Improvements in Fasteners for Blind-Slats, of which the following is a specification.

This invention relates to a device for fastening blind slats.

In the accompanying drawings the improved fastener for blind slats is shown by way of example.

Figure 1 is a view in elevation of my device attached to a window blind. Fig. 2 is a side view of the fastener in closed position. Fig. 3 is a similar view to Fig. 2, the fastener being open. Fig. 4 shows a modified construction.

The device consists of a frame $a$ in which the laths $b$ forming a Venetian blind are pivoted by means of pivots $c$. Angle irons $d$ are secured by a leg to the laths and are pivoted by the other leg to a movable rail. This rail carries the fastening device proper which consists of a lever $f$ and stud $h$ mounted on the free end of a spring $g$. The lever $f$ has two arms $k$ and $l$ which both serve for pushing the stud $h$ out of the rack $i$. If the lever $f$ is being pulled down the arm $l$ acts upon the spring $g$, while the arm $k$ acts upon said spring if the lever $f$ is being pulled up. The first movement serves for opening the blind and the second movement serves for closing the same. The lever $f$ need not be returned automatically to the intermediate position as the pull in the one or in the other direction is sufficient for operating the device. If the device is to be used with blinds which are not easily accessible, a pull string $n$ is fixed to the lever $f$ and wound around a pulley $m$ so that if said pulley is being turned the lever $f$ is operated in the one or in the other direction.

According to the modified construction Fig. 4 a stud $o$ is substituted for the lever $f$. This stud $o$ is under the influence of a spring and has an arm $p$ guided in a sleeve $q$ and engaging with the rack $i$. If the stud $o$ is pushed in the direction of the arrow, its arm $p$ moves out of engagement with the rack $i$. If the stud is released its arm $q$ returns to the locking position under the action of the spring.

I claim:—

A fastener for blind slats, comprising in combination a rail, angle pieces adapted to connect said rail to the blind slats, a curved rack adapted to be attached to the blind frame, a lever attached to said rail and having two arms, a blade spring attached to said rail, a stud at the end of said blade spring engaging with said rack for maintaining the blind in position, substantially as described and shown and for the purpose set forth.

In witness whereof I have hereunto set my hand in the presence of two witnesses.

BARTHOLOMÄUS JÄCKLE.

Witnesses:
 M. ROHLER,
 WILHELM HERRNETT.

Copies of this patent may be obtained for five cents each, by addressing the "Commissioner of Patents, Washington, D. C."